Oct. 28, 1969     A. J. SCALORA     3,475,243
CONTAINER SEALING METHOD
Filed March 28, 1966
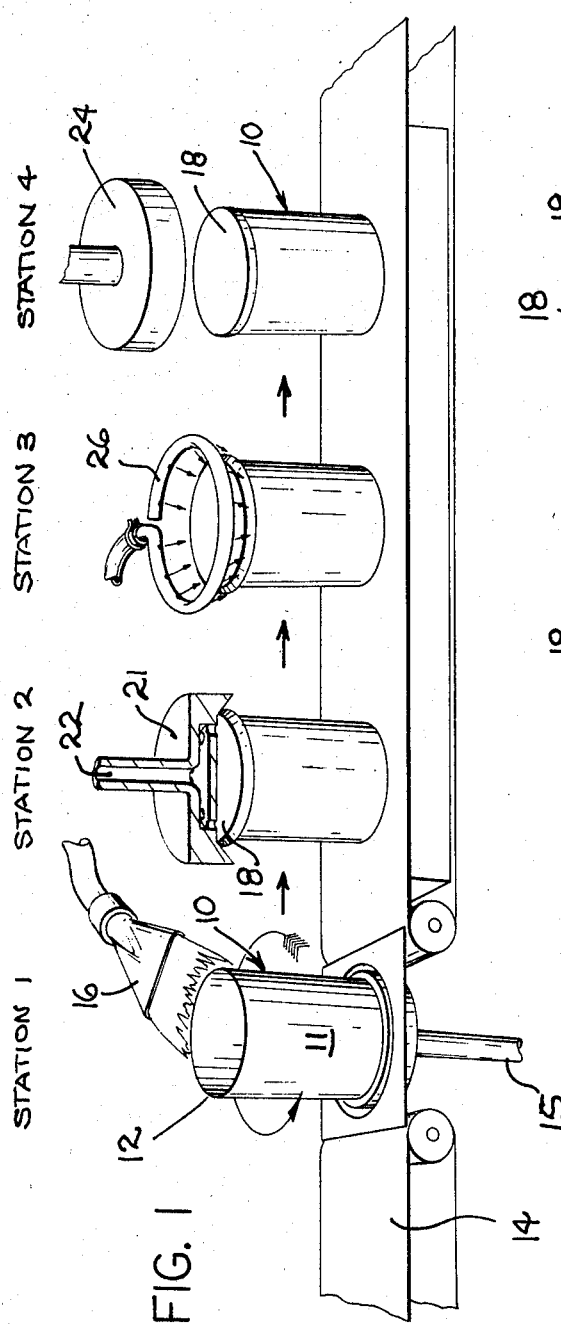
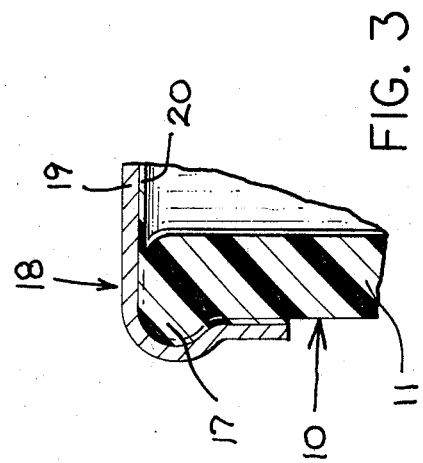
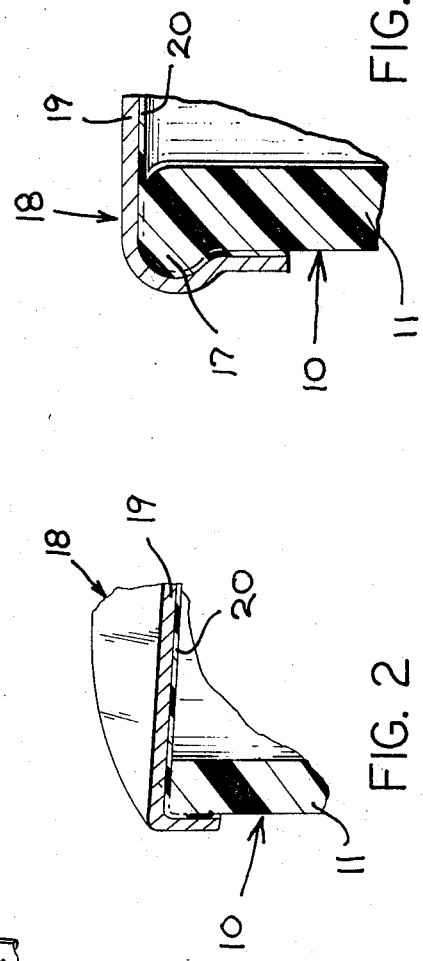
INVENTOR.
ANTHONY J. SCALORA
BY Philip M. Rice
& W. A. Schaich
ATTORNEYS

United States Patent Office 3,475,243
Patented Oct. 28, 1969

3,475,243
CONTAINER SEALING METHOD
Anthony J. Scalora, Toledo, Ohio, assignor to Owens-Illinois, Inc., a corporation of Ohio
Filed Mar. 28, 1966, Ser. No. 537,893
Int. Cl. B29c 17/02; C09j 5/00
U.S. Cl. 156—69                    9 Claims

ABSTRACT OF THE DISCLOSURE

A method is provided for sealing thermoplastic containers with metal closures to form a liquid-tight, leak-proof seal. The annular portion surrounding the container opening is heated to melt a thin film of thermoplastic material and a metal closure member having at least one surface coated with thermoplastic material is applied to the heated annular portion with the thermoplastic coating facing the heated portion to create an interfacial bond between the container and such coating. The closure is then deformed, as by being subjected to a magnetic field, to move the peripheral portion thereof snugly against the container.

---

This invention relates to a method of sealing containers formed of thermoplastic material. More particularly, the invention relates to forming a liquid tight, leak-proof seal for a tubular thermoplastic container using a metallic closure.

It is an object of the present invention to provide a rapid and economical method of forming a liquid tight closure to a thermoplastic article.

It is another object of the present invention to provide a method for sealing containers which utilizes the heat sealing characteristics of thermoplastic material and the gripping characteristics of metal in a manner which provides a liquid tight, leak-proof seal to a thermoplastic container and yet which can be rapidly and economically applied.

The present invention achieves the desired objective of rapidly and economically providing a liquid tight seal for a thermoplastic container by heating the annular rim of the container in a manner which will melt a thin film of plastic and yet will not materially distort the finish and then applying a plastic coated metal foil disc to the container rim. Thereafter the container with the metal disc is subjected to a strong magnetic impulse pressure which causes the metal disc to be compressed and thus firmly engaged to the container rim. A discussion of the art of magnetic pulse forming may be had by reference to an article entitled "Increasing Applications of Magnetic Pulse Forming" which appeared in the April 1963 issue of Machinery magazine and in United States Patent No. 2,976,907. These disclosures are incorporated herein by reference.

Other objects and advantages of the present invention may be had by reference to the following description taken in conjunction with the annexed sheet of drawings in which:

FIGURE 1 is a schematic diagram illustrating the sequence of steps for sealing the container under the present invention.

FIGURE 2 is an enlarged sectional view taken through the sealed portion of a container.

FIGURE 3 is a view similar to FIGURE 2 showing a modified embodiment.

Referring now to the drawings, the container 10 to be sealed will typically include a body portion 11 which is shown in the drawing as being generally cylindrical, terminating at its upper end in an annular rim 12. The container 10 is formed of thermoplastic material and may be molded by one of many methods well known in the art, such as injection molding or blow molding, for example. If desired, the container 10 may be molded with an integrally formed bottom portion.

As shown schematically in FIGURE 1, the container 10 is moved on any desired conveying means 14 to Station 1 where there is provided heating means 16 positioned to direct heat to the annular rim 12. Preferably intense heat is directed to a concentrated area of the rim so that such concentrated area quickly melts. Flame heat is ideally suited for this purpose. During heating, the container is preferably rotated by any desired rotating means 15 to continuously expose a different portion of the rim 12 to the concentrated flame. In this manner a thin film of melted plastic will be provided on the annular rim and yet the container will not become deformed but rather will retain its original shape. If desired, however, the speed of rotation and the time and intensity of heating can be varied to form an enlarged annular bead 17 (FIGURE 3) resulting from the centrifugal force forcing the molten film of thermoplastic material to flow outwardly.

The container is then quickly transferred to Station 2 where a closure member 18 is applied while the heated plastic is still molten. The closure member 18 includes a metallic portion 19 having a thermoplastic coating 20 on one surface thereof. The metallic portion 19, for reasons of economy, is preferably as thin as possible taking into consideration the intended use of the container and nature of the product packaged therein.

The closure member 18 may be applied, for example, by a vacuum chuck 21 having passageways 22 connected to a source of vacuum for retaining the closure member 18 thereon. If desired, the chuck may have a downwardly flared flange which serves to turn downwardly the outer peripheral portion of the closure member 18 over the container rim 12. The closure member 18 is preferably urged downwardly into firm contact with all portions of the annular rim 12. It is positioned on the annular rim with the thermoplastic coating 20 facing the melted thermoplastic film. The melted film on the annular rim 12 forms an interfacial bond with the thermoplastic coating 20 of the closure member 18. The container 10 is then moved to Station 4 where an electromagnetic metal forming device 24 of the type described in the above-referenced United States Patent No. 2,976,907 and in the referenced magazine article, subjects the closure 18 to a force impulse which causes such closure member to be deformed against and firmly engage the side wall of body portion 11.

An enlarged fragmentary sectional view of the container 10 with the closure member thus applied is illustrated in FIGURE 2.

If it is desired that the container have a pronounced annular bead, it may be desirable to apply a cooling medium to set up the thermoplastic material after the thermoplastic coating 20 has become bonded to the melted film, but before the closure member is subject to the force impulse at Station 4. This may be accomplished either by introducing cool air through the passageways 22 of the chuck 21 or by stopping the container 10 at a cooling station, Station 3, which is provided with a cooling ring 26, adapted to direct a cooling fluid to the container 10.

Other modifications within the spirit and scope of this invention will become readily apparent to those skilled in the art.

It may be seen from the foregoing that the present invention provides a novel and economical and efficient method for forming a liquid tight seal on a thermoplastic container.

I claim:
1. The method of sealing an opening of a thermoplastic container comprising the steps of:
  heating an annular portion surrounding said opening to melt such annular portion,
  applying a metal member having at least one surface coated with thermoplastic material to said heated annular portion with the thermoplastic material facing the annular portion, and subjecting said metal member to a magnetic field to deform the peripheral portion thereof snugly against said container around said annular portion.

2. The method as set forth in claim 1 wherein the container is rotated during heating.

3. The method as set forth in claim 1 wherein said container retains substantially its original shape.

4. The method as set forth in claim 2 wherein an outwardly extending annular bead is formed during said heating and rotation.

5. The method as set forth in claim 4 wherein said annular bead is cooled after the metal member is applied but before it is deformed.

6. The method of sealing an opening of a thermoplastic container comprising the steps of:

heating an annular portion surrounding said opening to melt a thin film of thermoplastic material around said annular portion without substantially deforming such container, rotating the container during heating causing said melted film to flow outwardly to form an outwardly extending annular bead, applying a metal member having at least one surface coated with thermoplastic material to said heated annular portion with the thermoplastic material facing the annular portion to create an interfacial bond between said annular bead and said one surface, cooling said annular bead, and then subjecting said metal member to a magnetic field to deform the peripheral portion thereof snugly against said container around said annular portion.

7. The method of sealing an opening of a thermoplastic container comprising the steps of:

heating an annular portion surrounding said opening to melt a thin film of thermoplastic material around said annular portion without substantially deforming such container, applying a metal member, having at least one surface coated with thermoplastic material, to said heated annular portion with the thermoplastic material facing the annular portion to create an interfacial bond between said annular portion and said one surface, and then deforming said metal member snugly against said container around said annular portion.

8. The method as set forth in claim 7 wherein the container is rotated during heating to form an outwardly extending annular bead around said opening.

9. The method as set forth in claim 7 wherein said container retains substantially its original shape.

References Cited

UNITED STATES PATENTS

| 2,620,939 | 12/1952 | Weisgerber | 156—69 X |
| 2,678,471 | 5/1954 | Barton | 156—69 X |
| 2,744,655 | 5/1956 | Vnuk | 156—69 X |
| 3,222,771 | 12/1965 | Schwinghamer | 72—56 X |
| 3,252,313 | 5/1966 | Eilers et al. | 72—56 |

HAROLD ANSHER, Primary Examiner

U.S. Cl. X.R.

72—56; 156—272, 306 321, 322, 380